United States Patent [19]

Sadowski

[11] Patent Number: 5,090,636
[45] Date of Patent: Feb. 25, 1992

[54] AIRCRAFT

[76] Inventor: James M. Sadowski, 106 Linden La., Apt. 4, Thiensville, Wis. 53092

[21] Appl. No.: 644,832

[22] Filed: Jan. 23, 1991

[51] Int. Cl.⁵ .............................................. B64C 31/02
[52] U.S. Cl. ........................................ 244/16; 244/36;
446/61; D12/333; D21/83; D21/87
[58] Field of Search .................... 244/36, 16, 13, 15,
244/106; 446/61, 68; D12/333; D21/82, 83, 87, 88, 89

[56] References Cited

U.S. PATENT DOCUMENTS

| | | | |
|---|---|---|---|
| D. 144,109 | 3/1946 | Hite et al. | D12/333 |
| D. 149,848 | 6/1948 | Struck | D21/87 |
| D. 226,718 | 4/1973 | McAllister | D21/83 |
| D. 287,036 | 12/1986 | Ninomiya | D21/89 |
| 2,217,111 | 10/1940 | Gould | D21/83 |
| 2,896,370 | 7/1959 | Witt, Jr. | 446/61 |
| 3,706,430 | 12/1972 | Kline et al. | 244/35 |
| 4,046,338 | 9/1977 | Kline et al. | 244/213 |
| 4,292,757 | 10/1981 | Cahen, Jr. | 46/80 |
| 4,512,690 | 4/1985 | Johnson | 446/61 |
| 4,519,746 | 5/1985 | Wainauski et al. | 416/223 R |
| 4,552,511 | 11/1985 | Sumigawa | 416/242 |
| 4,606,519 | 8/1986 | Fertis et al. | 244/200 |
| 4,641,796 | 2/1987 | Feifel | 244/35 R |
| 4,962,978 | 10/1990 | Weston | 244/106 |

FOREIGN PATENT DOCUMENTS 717054  12/1931  France .................................. 244/106

Primary Examiner—Galen Barefoot
Attorney, Agent, or Firm—Andrus, Sceales, Starke & Sawall

[57] ABSTRACT

An aircraft comprises a body portion and a pair of wings extending from either side of the body portion. An upward step is formed in the underside of the body portion in the center of the aircraft, and defines a rearwardly facing riser surface. The riser surface extends outwardly toward the wing tips, terminating substantially inwardly of the wing tips so that a majority of the length of the underside of each wing is uninterrupted by the riser surface. The step is located at the front-to-rear center of gravity of the aircraft, and provides an area of low pressure adjacent the riser surface to maintain the rear portion of the aircraft down. The aircraft can be constructed either as a full-scale or a small-scale aircraft.

9 Claims, 1 Drawing Sheet

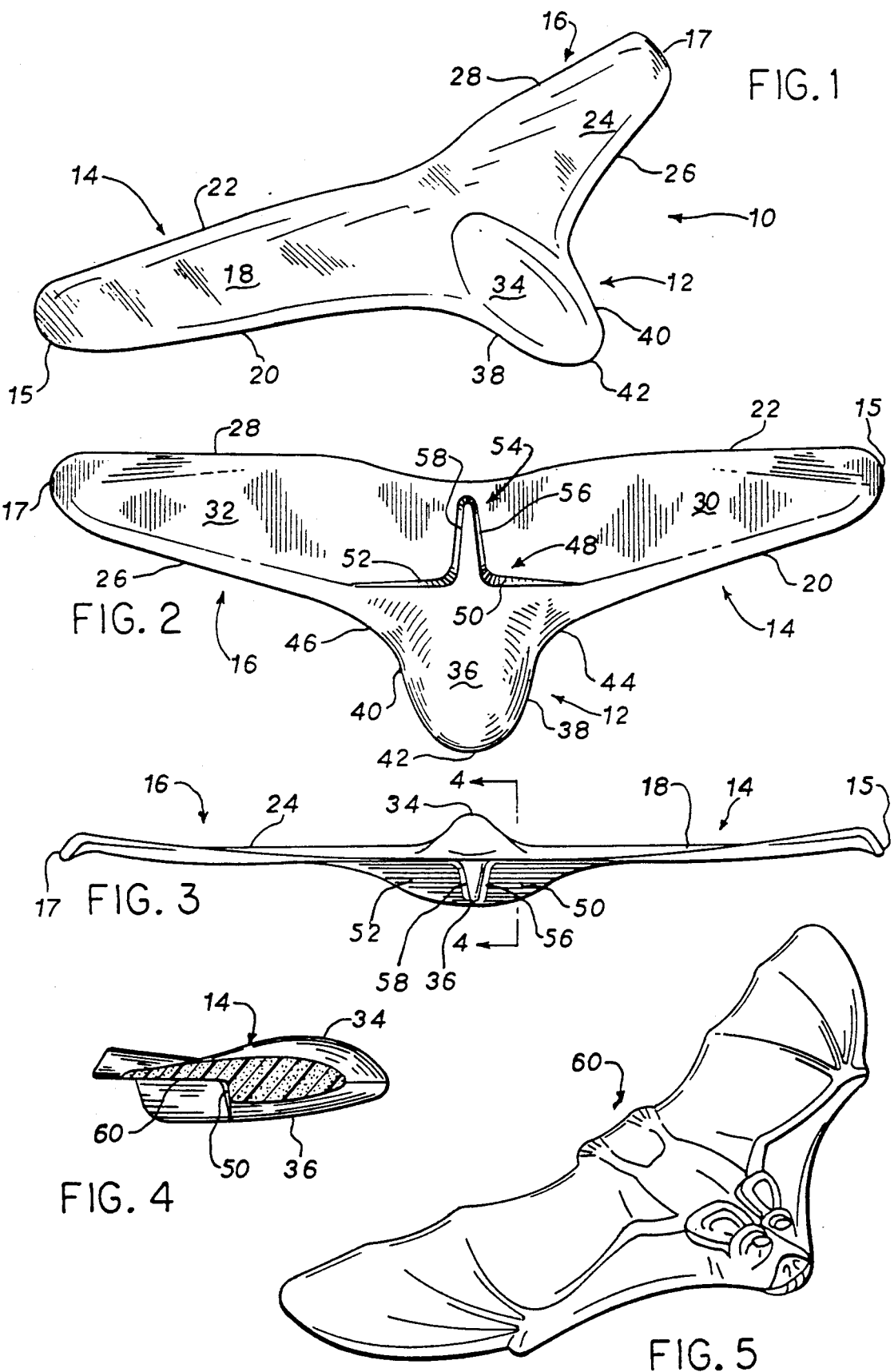

AIRCRAFT

BACKGROUND AND SUMMARY

This invention relates to an aircraft of the heavier-than-air type, and more particularly to a stability-enhancing feature for an aircraft.

Various structures are known for providing increased aircraft lift and/or stability. One such structure is shown in Kline et al., U.S. Pat. No. 4,046,338. This patent shows forming a step-like discontinuity in the lower surface of each aircraft wing and mounting a pivotal lift-generating member at the lower edge defined by the step-like discontinuity.

The present invention has as its object to enhance the stability and lift of an aircraft, constituting an improvement over the structure shown in the noted patent to Kline et al. It is a further object of the invention to provide such a structure which is easily incorporated into a small-scale or full-scale aircraft.

In accordance with one aspect of the invention, an aircraft includes upper and lower surfaces extending between a forward edge and a rear edge of the aircraft. The aircraft is substantially symmetrical about a longitudinal axis or centerline extending through the central portion of the aircraft. An upward step is formed in the lower surface of the aircraft forwardly of the rear edge of the aircraft. The upward step includes a rearwardly facing riser surface, with the step being located in the central portion of the aircraft. The aircraft upper and lower surfaces terminate in a pair of wing tips, and the rearwardly facing riser surface provided by the step terminates on each side of the aircraft well inwardly of the wing tip, so that a majority of the length of the lower surface of the aircraft on either side of the aircraft centerline is uninterrupted by the step. The rearwardly facing riser surface defined by the step is substantially vertical, and the portion of the aircraft lower surface disposed rearwardly of the step is substantially horizontal, extending between the rear edge of the aircraft and the upper end of the riser surface defined by the step.

In one form of the invention, the aircraft is adapted for manual launching by a user, and structure is provided on the lower surface of the aircraft extending rearwardly from the riser surface formed by the step, including a pair of side surfaces adapted to be engaged by the user's fingers.

The riser surface formed by the step tapers upwardly in a direction toward each wing tip, to merge with the uninterrupted lower surface of the aircraft.

In one form of the invention, the aircraft includes a central body portion extending along the aircraft centerline, with the step being formed in the underside of the body portion. The forward edge of the aircraft defines a forwardly extending central area to the body portion extending along the aircraft centerline, with the forward edge on either side of the body portion extending rearwardly and outwardly toward each wing tip and cooperating with the rear edge of the aircraft to define a pair of wings. The front-to-rear center of gravity of the aircraft is located approximately at the step. With this arrangement, the body portion located forwardly of the step provides a mass counterbalancing that of the wings and body portion located rearwardly of the step.

The invention further contemplates a method of enhancing the stability of an aircraft, substantially in accordance with the foregoing summary.

Various other objects, features and advantages of the invention will be made apparent upon consideration of the following description taken together the drawings.

BRIEF DESCRIPTION OF THE DRAWINGS

The drawings illustrate the best mode presently contemplated of carrying out the invention.

In the drawings:

FIG. 1 is an isometric view showing the upper surface of an aircraft constructed according to the invention;

FIG. 2 is a bottom plan view of the aircraft of FIG. 1;

FIG. 3 is a rear elevation view of the aircraft of FIGS. 1 and 2;

FIG. 4 is a sectional view taken along line 4—4 of FIG. 3; and

FIG. 5 is a view similar to FIG. 1, showing another embodiment of the aircraft of the invention.

DETAILED DESCRIPTION OF THE PREFERRED EMBODIMENT

Referring to FIG. 1, an aircraft 10 generally comprises a central body portion 12, with a wing 14 extending rightwardly from body portion 12 and terminating in a wing tip 15, and a wing 16 extending leftwardly from body portion 12 and terminating in a wing tip 17. Aircraft 10 is symmetrical about an aircraft centerline extending longitudinally and centrally through body portion 12 between wings 14,16.

Wing 14 defines an upper surface 18 extending between a forward edge 20 and a rear edge 22. Likewise, wing 16 defines an upper surface 24 extending between a forward edge 26 and a rear edge 28. Referring to FIG. 2, wing 14 defines a lower surface 30 extending between forward edge 20 and rear edge 22, and wing 16 defines a lower surface 32 extending between forward edge 26 and rear edge 28.

Referring to FIGS. 1 and 3, body portion 12 includes an upper surface 34 and a lower surface 36, which cooperate to define a pair of angled side surfaces 38,40 which merge at a rounded nose 42 defining the forwardmost edge of aircraft 10.

Referring to FIG. 2, forward edge 20 of wing 14 and edge 38 of body portion 12 converge at a curved junction 44. Forward edge 20 of wing 14 extends outwardly and rearwardly toward wing tip 15 of wing 14 from junction 44. In a similar manner, forward edge 26 of wing 16 converges with edge 40 of body portion 12 at a curved junction 46, and forward edge 26 extends outwardly and rearwardly toward wing tip 17 of wing 16 from junction 46.

Referring to FIG. 3, upper surface 34 of body portion 12 defines a hump extending in a forward-to-rearward direction along the centerline of aircraft 10. The hump defined by body portion upper surface 34 terminates at edges 38,40 and nose 42, and the rearwardmost extent of the hump is located substantially inwardly from the rear edge of aircraft 10 as defined by rear edges 22,28.

Referring to FIGS. 2 and 3, an upward step, shown generally at 48, is formed in the underside of aircraft 10. Step 48 defines a pair of rearwardly facing riser surfaces, shown at 50,52, which are symmetrical about the aircraft centerline. A rearwardly extending projection 54 is disposed between riser surfaces 50,52, extending along the aircraft centerline. Projection 54 defines a pair of side surfaces 56,58, the purpose of which will be explained.

Riser surfaces 50,52 defined by step 48 are substantially vertical, extending between body portion lower surface 36 and lower surfaces 30,32 of wings 14,16, respectively. Referring to FIG. 4, the portion of wing 14 located rearwardly of riser surface 50, shown at 60, is substantially horizontal, cooperating with riser surface 50 to define a right angle. The portion of wing 16 located rearwardly of riser surface 52 likewise is horizontal.

Referring to FIG. 3, lower surface 36 of body portion 12 is formed such that riser surface 50 extends outwardly toward tip 15 of wing 14, tapering upwardly toward lower surface 30 of wing 14 to merge therewith. Riser surface 52 is substantially a mirror image of riser surface 50. With the arrangement as shown, riser surfaces 50,52 merge with lower surfaces 30,32 of wings 14,16, respectively, such that a majority of the length of wing lower surfaces 30,32 are uninterrupted by riser surfaces 50,52, respectively.

Step 48 and riser surfaces 50,52 formed thereby, are located at the front-to-rear center of gravity of aircraft 12. In this manner, body portion 12 located forwardly of step 48 counterbalances the weight of the portion of wings 14,16 located rearwardly of step 48.

During forward movement of aircraft 10, riser surfaces 50,52 provide a low pressure vortex immediately rearwardly of the aircraft center of gravity, to provide a "pendulum effect" which provides stability to hold the rear portion of the aircraft down during flight. Put another way, riser surfaces 50,52 act as a canard, which increases the stability of aircraft 10.

Aircraft 10 can be either a full-scale aircraft adapted to be propelled by conventional jet or propeller motors (not shown), or may be a small-scale model, such as illustrated, adapted for manual launching by a person. In the small-scale version, side surfaces 56,58 provided by rearwardly extending projection 54 are adapted to be gripped by the user's fingers, thus enabling the person to launch aircraft 10 with a forward throwing motion.

FIG. 5 illustrates an aircraft 60 formed such that its upper surface resembles a flying bat. The underside of the wings of aircraft 60, as well as of the central body portion of aircraft 60, is constructed the same as that shown in FIGS. 2 and 3. Other shapes of aircraft could also be formed, incorporating the lower structure as shown in FIG. 2.

Various alternatives and embodiments are contemplated as being within the scope of the following claims particularly pointing out and distinctly claiming the subject matter regarded as the invention.

I claim:

1. An aircraft, comprising:
    a central body portion defining an upper surface and a lower surface and terminating in a forwardly disposed nose, wherein the lower surface extends downwardly and rearwardly from the nose;
    a pair of wings extending laterally outwardly one from each side of the body portion, each wing terminating in a wing tip, with each wing defining an upper wing surface and a lower wing surface, and wherein the wings and body portion cooperate to define a forward edge and a rearward edge of the aircraft, and wherein the rearward edge of the aircraft extends laterally between the wing tips and defines the rearwardmost extent of each wing, whereby the aircraft is tailless; and
    wherein an upward step is formed in the underside of the aircraft extending between the body portion lower surface and the lower wing surfaces, to define a rearwardly facing riser surface disposed forwardly of the rearward edge of the aircraft defined by the wings and body portion.

2. The aircraft of claim 1, wherein the rearwardly facing riser surface provided by the step terminates on each side of the centerline of the aircraft inwardly of the wing tip, so that a majority of the length of the wing lower surfaces is uninterrupted by the step.

3. The aircraft of claim 2, wherein the rearwardly facing riser surface comprises a substantially vertical surface.

4. The wing of claim 2, wherein the aircraft lower surfaces disposed rearwardly of the step comprise a substantially horizontal surfaces extending between the rear edge of the aircraft and the upper end of the riser surface defined by the step.

5. The aircraft of claim 2, wherein the aircraft is adapted for manual launching by a user, and further comprising structure extending rearwardly from the riser surface and including a pair of side surfaces adapted to be engaged by the fingers of a user.

6. The aircraft of claim 5, wherein the structure extending rearwardly from the riser surface is substantially symmetrical about the aircraft longitudinal axis and terminates forwardly of the rear edge of the aircraft.

7. The aircraft of claim 2, wherein the riser surface formed by the step tapers upwardly in a direction toward each wing tip to merge with the uninterrupted lower surface of the aircraft.

8. The aircraft of claim 2, wherein the front-to-rear center of gravity of the aircraft is located approximately at the step, so that the body portion located forwardly of the step provides a mass to counterbalance that of the wings and body portion located rearwardly of the step.

9. The aircraft of claim 2, wherein the aircraft upper surface is formed into the shape of a flying creature.

* * * * *